(12) United States Patent
Nilsson et al.

(10) Patent No.: US 12,403,746 B2
(45) Date of Patent: Sep. 2, 2025

(54) THERMAL MANAGEMENT SYSTEM FOR A VEHICLE

(71) Applicant: Volvo Car Corporation, Gothenburg (SE)

(72) Inventors: Ulf Nilsson, Gothenburg (SE); Filip Nielsen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 367 days.

(21) Appl. No.: 17/833,947

(22) Filed: Jun. 7, 2022

(65) Prior Publication Data

US 2022/0396120 A1 Dec. 15, 2022

(51) Int. Cl.
*B60H 1/00* (2006.01)
*B60H 1/22* (2006.01)
(Continued)

(52) U.S. Cl.
CPC ..... *B60H 1/00642* (2013.01); *B60H 1/00278* (2013.01); *B60H 1/00485* (2013.01); *B60H 1/2221* (2013.01); *B60L 58/24* (2019.02); *H01M 10/625* (2015.04); *H01M 10/63* (2015.04); *H01M 10/6568* (2015.04); *H01M 10/66* (2015.04); *B60H 2001/00307* (2013.01); *H01M 2220/20* (2013.01)

(58) Field of Classification Search
CPC ............ B60H 1/00642; B60H 1/00485; B60H 1/2221; B60H 1/00278; B60L 58/24
See application file for complete search history.

(56) References Cited

U.S. PATENT DOCUMENTS

| 2016/0031291 A1* | 2/2016 | Enomoto | B60K 11/02 62/189 |
| 2020/0047591 A1 | 2/2020 | He et al. | |
| 2021/0331554 A1* | 10/2021 | Mancini | B60H 1/00278 |

FOREIGN PATENT DOCUMENTS

| KR | 20200008516 A | 1/2020 |
| WO | 2019225867 A1 | 11/2019 |
| WO | 2021055758 A1 | 3/2021 |

OTHER PUBLICATIONS

Nov. 30, 2021 European Search Report issued in Corresponding EP Application No. 21179612.

* cited by examiner

*Primary Examiner* — Nael N Babaa
(74) *Attorney, Agent, or Firm* — Clements Bernard Walker; Christopher L. Bernard

(57) ABSTRACT

The present disclosure relates to a thermal management system for a vehicle including a refrigerant system, a coolant system and a control unit. The coolant system includes a first control loop thermally coupled to an energy storage system, a second control loop thermally coupled to a drive train system, a third control loop thermally coupled to a radiator system, a first multiple valve unit and a second multiple valve unit, and a first heat exchanger configured to transfer heat to the refrigerant system. The first control loop, the second control loop and the third control loop are configured to transfer heat to the first heat exchanger. The first heat exchanger is arranged between the first multiple valve unit and the second multiple valve unit. The control unit is configured to switch the first multiple valve unit and the second multiple valve unit in a first mode to couple the first control loop with the second control loop to collectively transfer heat to the first heat exchanger independently of the third control loop.

20 Claims, 7 Drawing Sheets

(51) Int. Cl.
*B60L 58/24* (2019.01)
*H01M 10/625* (2014.01)
*H01M 10/63* (2014.01)
*H01M 10/6568* (2014.01)
*H01M 10/66* (2014.01)

THERMAL MANAGEMENT SYSTEM FOR A VEHICLE

CROSS-REFERENCE TO RELATED APPLICATION

The present disclosure claims the benefit of priority of co-pending European Patent Application No. 21179612.3, filed on Jun. 15, 2021, and entitled "Thermal Management System for a Vehicle," the contents of which are incorporated in full by reference herein.

TECHNICAL FIELD

The present disclosure relates to a thermal management system for a vehicle, a vehicle including such a thermal management system and a manufacturing method of such a thermal management system.

BACKGROUND

To allow an efficient use of energy in battery electric vehicles or hybrid electric vehicles, a heat pump is often used to heat a vehicle cabin to enable and utilize low temperature heat sources. The refrigerant circuit includes one or more heat exchangers for transferring heat from and/or to the air heating or cooling the vehicle cabin. To achieve the most effective heating of the vehicle cabin, one would like to enable and use the available heat sources in the vehicle, e.g. waste heat generated from vehicle components and/or thermal inertia of said components. However, in such vehicles, an amount of waste heat is limited and the thermal inertia may be restricted by the optimal operating temperature of e.g. the battery system. Additionally, the battery system in electric vehicles requires a reliable thermal management system to ensure that the battery system remains within its desired operating temperature range.

SUMMARY

Hence, there may be a need to provide an improved thermal management system, which maximizes a number of available heat sources of a vehicle and the flexibility of which source to use. The improved thermal management system may further minimize energy required for heating a vehicle cabin and/or a battery system of the vehicle.

The problem is at least partially solved or alleviated by the subject matter of the present disclosure. It should be noted that the aspects of the disclosure described in the following apply to the thermal management system for a vehicle, the vehicle including such a thermal management system and the manufacturing method of such a thermal management system.

According to the present disclosure, a thermal management system for a vehicle is presented. The thermal management system includes a refrigerant system, a coolant system and a control unit. The coolant system includes a first control loop thermally coupled to an energy storage system, a second control loop thermally coupled to a drive train system and a third control loop thermally coupled to a radiator system. The coolant system further includes a first multiple valve unit, a second multiple valve unit and a first heat exchanger configured to transfer heat to the refrigerant system. The first control loop, the second control loop and the third control loop are configured to transfer heat to the first heat exchanger. The first heat exchanger is arranged between the first multiple valve unit and the second multiple valve unit. The control unit is configured to switch the first multiple valve unit and the second multiple valve unit in a first mode to couple the first control loop with the second control loop to collectively transfer heat to the first heat exchanger independently of the third control loop.

The thermal management system according to the present disclosure allows a flexible use of heat sources of the vehicle. By providing one or more multiple valve units, a flow direction of a coolant medium transferring heat among the first control loop, second control loop, third control loop and the first heat exchanger may be variably and selectively switched. Hence, in addition to heat transfer between the coolant system and the refrigerant system via the heat exchanger, heat from ambient air and/or from the energy storage system may be also utilized as a collective or separate heat source. Accordingly, a flexible and efficient use of heat sources can be achieved and an energy efficiency of the thermal management system can be improved.

The thermal management system may be configured to monitor and control temperature of various components arranged in the vehicle such as a passenger compartment of the vehicle, in other words vehicle cabin. The thermal management system may be divided in the refrigerant system and the coolant system. The refrigerant system may include an air conditioning unit and it may be configured to cool or heat the vehicle cabin. The refrigerant system may be in fluid communication with the coolant system via a heat exchanger interface.

The coolant system may include several thermal control loops, through which the coolant medium may flow to transfer heat. Each control loop may be thermally coupled with different components of the vehicle, for instance an energy storage system, a drive train system, a radiator system etc. The energy storage system may be a battery system supplying electrical power to various sub-systems of the vehicle to operate them. The drive train system may include an electric machine, power electronics such as inverters, direct current converters, charging electronics, and computing units or the like. The radiator system may include a coolant-to air heat exchanger to allow heat transfer between the coolant system and ambient air.

The first control loop, the second control loop and the third control loop may be connected to the first multiple valve unit and the second multiple valve unit to deliver the coolant medium to a diverse direction inside the coolant system. The term "multiple valve unit" may be understood as a valve unit including a plurality of channels, through which the coolant medium may be guided. The plurality of channels may serve as an inlet or outlet of the coolant medium.

The first heat exchanger arranged between the first multiple valve unit and the second multiple valve unit may form the heat exchanger interface between the coolant system and the refrigerant system. The first heat exchanger may be a chiller configured to transfer heat from the coolant system to the refrigerant system to heat the vehicle cabin. In other words, the coolant medium flowing from the first multiple valve unit may release heat in the first heat exchanger and move to the second multiple valve unit.

The control unit may be an electronic control unit (ECU). The control unit may be configured to switch the first multiple valve unit and the second multiple valve unit to enable the heat transfer in a desired direction within the coolant system. Accordingly, the control unit may be configured to implement various operating method of the thermal management system such as vehicle cabin heating, vehicle cabin cooling, radiator system thawing, energy storage system heating or cooling, drive train cooling or the like.

Hence, in the first mode of the thermal management system, the first multiple valve unit and the second multiple valve unit may be switched such that the first control loop and the second control loop are thermally connected to each other to collectively transfer heat to the first heat exchanger independently of the third control loop. In other words, the control unit may allow the coolant medium to circulate between the first control loop coupled to the energy storage system and the second control loop coupled to the drive train system to release heat in the first heat exchanger. Meanwhile, the heat transfer through the third control loop may be bypassed and not connected to the first heat exchanger.

Alternatively, the control unit may allow heat transfer from the first control loop to the second control loop and the first heat exchanger or heat transfer from the second control loop to the first control loop and the first heat exchanger.

Accordingly, the thermal management system may be configured for vehicle cabin heating, wherein the first heat exchanger may deliver heat to the refrigerant system, which is collectively transferred from the energy storage system and the drive train system.

In an embodiment, the control unit is further configured to switch the first multiple valve unit and the second multiple valve unit in a second mode to couple the second control loop with the third control loop to collectively transfer heat to the first heat exchanger independently of the first control loop. In the second mode, the first multiple valve unit and the second multiple valve unit of the coolant system may be switched such that the second control loop and the third control loop are in fluid communication while bypassing the first control loop. In other words, the control unit may allow the coolant medium to circulate between the second control loop coupled to the drive train system and the third control loop coupled to the radiator system to release heat in the first heat exchanger independently of the first control loop. Accordingly, the first heat exchanger may deliver heat to the refrigerant system, which is collectively transferred from the drive train system and the radiator system.

In an embodiment, the control unit is further configured to switch the first multiple valve unit and the second multiple valve unit in a third mode to transfer heat to the first heat exchanger by only one of the first control loop, the second control loop and the third control loop separately from each other. In the third mode, the first multiple valve unit and the second multiple valve unit of the coolant system may be switched such that only one of the energy storage system, the drive train system and the radiator system is thermally coupled with the first heat exchanger to release heat. In other words, the first heat exchanger may be in fluid communication with the first control loop independently of the second and third control loops, the second control loop independently of the first and third control loops or the third control loop independently of the first and second control loops.

If the first heat exchanger is connected only to the first control loop, heat generated by the energy storage system and/or thermal inertia may be the heat source for the first heat exchanger. If the first heat exchanger is only connected to the second control loop, heat generated by the drive train system and/or thermal inertia may be the heat source for the first heat exchanger. If the first heat exchanger is connected only to the third control loop, the heat source may be ambient air to transfer heat to the first heat exchanger. In such a case, the first multiple valve unit and the second multiple valve unit may additionally be configured to not connect the first and second control loops or connect the first control loop and the second control loop, independently of the third control loop. This enables the choice to heat the energy storage system using waste heat from the drive train system or not.

In an embodiment, the thermal management system further includes a second heat exchanger arranged between the first multiple valve unit and the second multiple valve unit. The second heat exchanger is configured to absorb heat from the refrigerant system. The second heat exchanger may include a water-cooled condenser and it may be configured to transfer heat from the refrigerant system to the coolant system. In other words, the coolant medium circulating in the coolant system may absorb heat from the refrigerant system in the second heat exchanger, wherein the refrigerant system is thermally coupled with the second heat exchanger. Hence, the second heat exchanger may transfer heat in a reverse direction relative to the first heat exchanger.

In an embodiment, the second heat exchanger is arranged in the second control loop or the third control loop. In other words, the second heat exchanger may be only arranged in the second control loop or only in the third control loop. Accordingly, heat absorbed from the second heat exchanger may be guided to the drive train system and/or the radiator system to further transfer heat.

In an embodiment, the second heat exchanger may be arranged only in the second control loop. The ambient heat source may be available with the third control loop coupled to the first heat exchanger and the first and second control loop may be connected with the second heat exchanger. Accordingly, the energy storage system may be heated by the second heat exchanger.

In an embodiment, the control unit is further configured to switch the first multiple valve unit and the second multiple valve unit in a fourth mode to couple the second control loop with the third control loop to collectively absorb heat from the second heat exchanger independently of the first control loop. In the fourth mode, the first multiple valve unit and the second multiple valve unit may separate the first control loop from the second control loop and the third control loop such that only the first control loop is coupled with the first heat exchanger and the second control loop and the third control loop are coupled with the second heat exchanger.

Accordingly, the coolant medium circulating the second control loop and the third control loop may absorb heat from the refrigerant system in the second heat exchanger together. Accordingly, if the vehicle cabin needs to be cooled, heat may be absorbed from the refrigerant system to the coolant system via the second heat exchanger to direct heat to the radiator system for the heat transfer to ambient air. The absorbed heat from the second heat exchanger and/or the drive train system may be directed to the radiator system for releasing or thawing the radiator system. Further, heat transfer from the radiator system and/or the second heat exchanger to ambient may be rejected. In addition, the energy storage system may be cooled by heat transfer via the first heat exchanger.

In an embodiment, the control unit is further configured to switch the first multiple valve unit and the second multiple valve unit in a fifth mode to couple the first control loop with the second control loop to collectively absorb heat from the second heat exchanger. In the fifth mode, the first multiple valve unit and the second multiple valve unit may connect the first control loop and the second control loop to the second heat exchanger and the third control loop may be connected to the first heat exchanger. Accordingly, the vehicle cabin may be heated by ambient air via the radiator system. Additionally, the energy storage system may be heated by heat transferred from the second heat exchanger and/or the waste heat from the drive train system.

In an embodiment, the first multiple valve unit and the second multiple valve unit are connected to a sub-control loop to adjust temperature of the coolant system and/or to divide heat transfer. In other words, the first multiple valve unit and the second multiple valve unit may divide and/or redirect at least a part of the coolant medium by a sub-control loop based on current and targeted temperature levels in the coolant system. The sub-control loop may allow separate flow of the coolant medium/heat at inlet or outlet ports of the first multiple valve unit and the second multiple valve unit. For instance, a portion of inflow from the drive train system in the first multiple valve unit may be directed to the energy storage system, whereas a remaining portion of the inflow from the drive train system in the first multiple valve unit may bypass the energy storage system via the sub-control loop. Alternatively, two different inflows from the drive train system and the radiator system in the first multiple valve unit may be collected as a single outflow to the energy storage system via the sub-control loop.

In an embodiment, the control unit is further configured to switch the first multiple valve unit and the second multiple valve unit in a sixth mode to transfer heat from the second heat exchanger only to the third control loop. In the sixth mode, the first multiple valve unit and the second multiple valve unit may be switched such that either the second control loop and the third control loop or only the third control loop is connected to the second heat exchanger to absorb heat from the refrigerant system. The heat absorbed in the second heat exchanger together with the waste heat from the drive train system may be delivered to only to the third control loop to thaw the radiator system. The first control loop may not be coupled with the second heat exchanger.

In an embodiment, the control unit is further configured to switch the first multiple valve unit and the second multiple valve unit in a seventh mode to couple the third control loop with the first control loop, the second control loop and the second heat exchanger to collectively transfer heat to the third control loop. Accordingly, the radiator system may allow cooling all of the first, second and third control loops as well as the refrigerant system, particularly, the air conditioning unit.

In an embodiment, the thermal management system further includes a high voltage coolant heater (HVCH) connected to the first heat exchanger. The high voltage coolant heater may be arranged between the first multiple valve unit and the first heat exchanger and it may act as a heat booster for the first heat exchanger. Accordingly, the high voltage coolant heater may transfer heat to the refrigerant system via the first heat exchanger. Additionally, the control unit may switch the first multiple valve unit and the second multiple valve unit such that heat from the HVCH may be further transferred to the first control loop to heat the energy storage system.

In an embodiment, the thermal management system may further include a high voltage coolant heater, preferably connected to the first control loop to additionally provide heat to the energy storage system and/or the vehicle cabin, in case available heating power of components in second control loop and the heat pump is not enough for heating the energy storage system.

In an embodiment, the first multiple valve unit and/or the second multiple valve unit includes a 5-way valve element. The 5-way valve element may include five ports, which may be variably and selectively coupled to the first, second and third control loops. The control unit may actuate the 5-way valve element to guide the coolant medium to the different control loops according to the operating method of the coolant system such as cooling, heating and thawing.

In an embodiment, the first multiple valve unit and/or the second multiple valve unit includes a 4-way valve element and a 3-way valve element. As an alternative to the 5-way valve element, a combination of the 4-way valve element and the 3-way valve element used in the coolant system, which may allow a variable and selective switch among the first, second and third control loop of the coolant system. However, the first multiple valve unit and the second multiple valve unit may not be limited to the 5-way valve element, the 4-way valve element and the 3-way valve element, but a number of the ports of the first multiple valve unit and the second multiple valve unit may vary.

According to the present disclosure, a vehicle is presented. The vehicle includes a thermal management system as described above. The vehicle may be a battery electric vehicle or a hybrid electric vehicle. In electric vehicles, the waste heat which may be utilized to heat a vehicle cabin and/or an energy storage system is limited. The vehicle including the thermal management system according to the present disclosure may facilitate a heat utilization by maximizing a number of available heat sources and the flexibility of how to use them to minimize energy required for heating a vehicle cabin and/or a battery system of the vehicle.

According to the present disclosure, a manufacturing method for a thermal management system for a vehicle is presented. The method includes:

providing a refrigerant system, providing a coolant system including a first control loop, a second control loop and a third control loop, providing a control unit, thermally coupling an energy storage system to the first control loop, thermally coupling a drive train system to the second control loop, thermally coupling a radiator system to the third control loop, and arranging a first heat exchanger between a first multiple valve unit and a second multiple valve unit.

The first heat exchanger is configured to transfer heat to the refrigerant system. The first control loop, the second control loop and the third control loop are configured to transfer heat to the first heat exchanger. The control unit is configured to switch the first multiple valve unit and the second multiple valve unit in a first mode to couple the first control loop with the second control loop to collectively transfer heat to the first heat exchanger independently of the third control loop.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter.

BRIEF DESCRIPTION OF THE DRAWINGS

Exemplary embodiments will be described in the following with reference to the following drawings.

DESCRIPTION OF EMBODIMENTS

Figure 1:
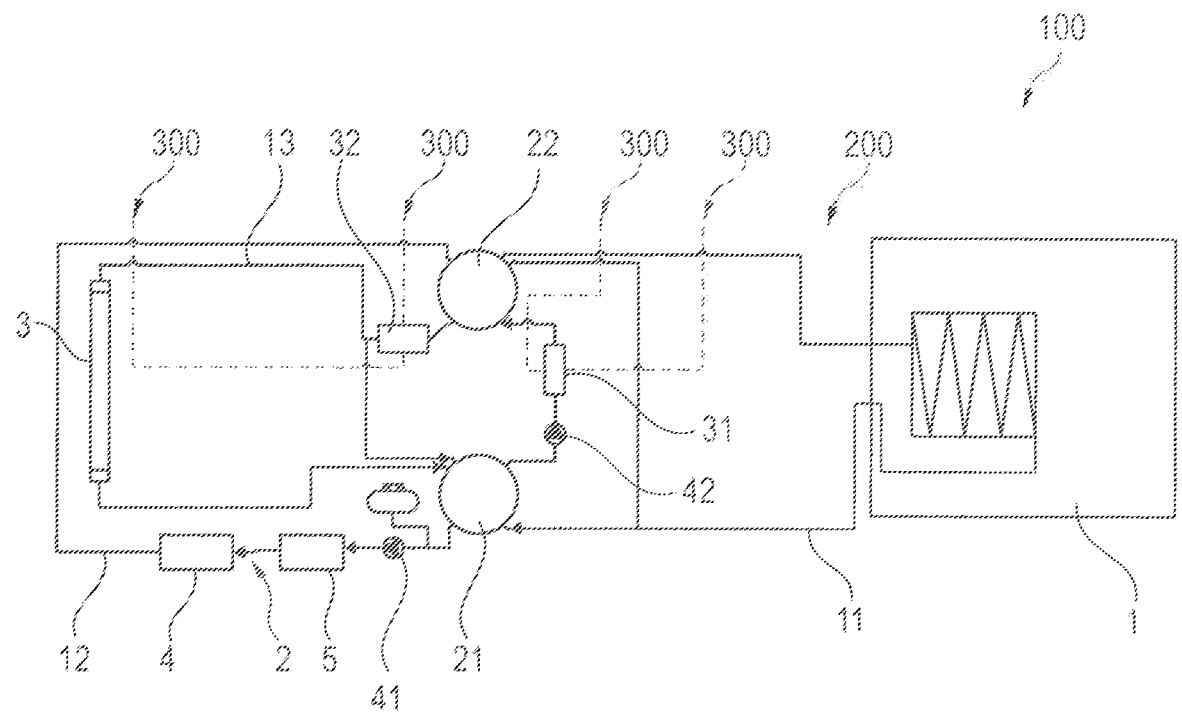
FIG. 1 shows schematically and exemplarily an embodiment of a thermal management system according to the present disclosure.

FIG. 1 to FIG. 15 show a thermal management system 100, which may be mounted in a battery electric vehicle (BEV) or a hybrid electric vehicle (HEV). The thermal management system 100 includes a refrigerant system 300, a coolant system 200 and a control unit (not shown). The refrigerant system 300 is configured to cool or heat the vehicle cabin. The coolant system 200 is thermally connected to the refrigerant system 300.

The coolant system 200 includes a first control loop 11, a second control loop 12 and a third control loop 13. The first control loop 11 is thermally coupled to an energy storage system 1 of the vehicle. The second control loop 12 is thermally coupled to a drive train system 2 including an electric machine 4, power electronics 5, etc. The third control loop 13 is thermally coupled to a radiator system 3, which is a coolant to ambient air heat exchanger. The coolant system 200 further includes two pumps means 41, 42. The first pump means 41 is arranged in the second control loop 12 and the second pump means 42 is arranged between a first valve unit 21 and a second valve unit 22.

The thermal management system 100 further includes the first multiple valve unit 21, the second multiple valve unit 22, a first heat exchanger 31 and a second heat exchanger 32. The first heat exchanger 31 may be a chiller configured to transfer heat from the coolant system 200 to the refrigerant system 300. The second heat exchanger 32 may be a water-cooled condenser configured to transfer heat from the refrigerant system 300 to the coolant system 200. The first heat exchanger 31 may be thermally coupled with an evaporator of the refrigerant system 300 and the second heat exchanger 32 may be thermally coupled with a condenser of the refrigerant system 300. Accordingly, the first heat exchanger 31 and the second heat exchanger 32 form a thermal interface between the refrigerant system 300 and the coolant system 200.

The first heat exchanger 31 and the second heat exchanger 32 may be arranged between the first multiple valve unit 21 and the second multiple valve unit 22. Further, the first multiple valve unit 21 and the second multiple valve unit 22 selectively connect the first control loop 11, the second control loop 12 and the third control loop 13.

The control unit is configured to actuate the first multiple valve unit 21 and the second multiple valve unit 22 to control an inflow and an outflow of a coolant medium circulating in the coolant system 200 to transfer heat. In particular, the control unit switch ports connected to the first and second multiple valve units 21, 22 individually to guide the coolant medium variably according to an operating method of the thermal management system 100. The operating method is for instance vehicle cabin cooling, vehicle cabin heating, energy storage system heating and radiator system thawing.

Figure 2:
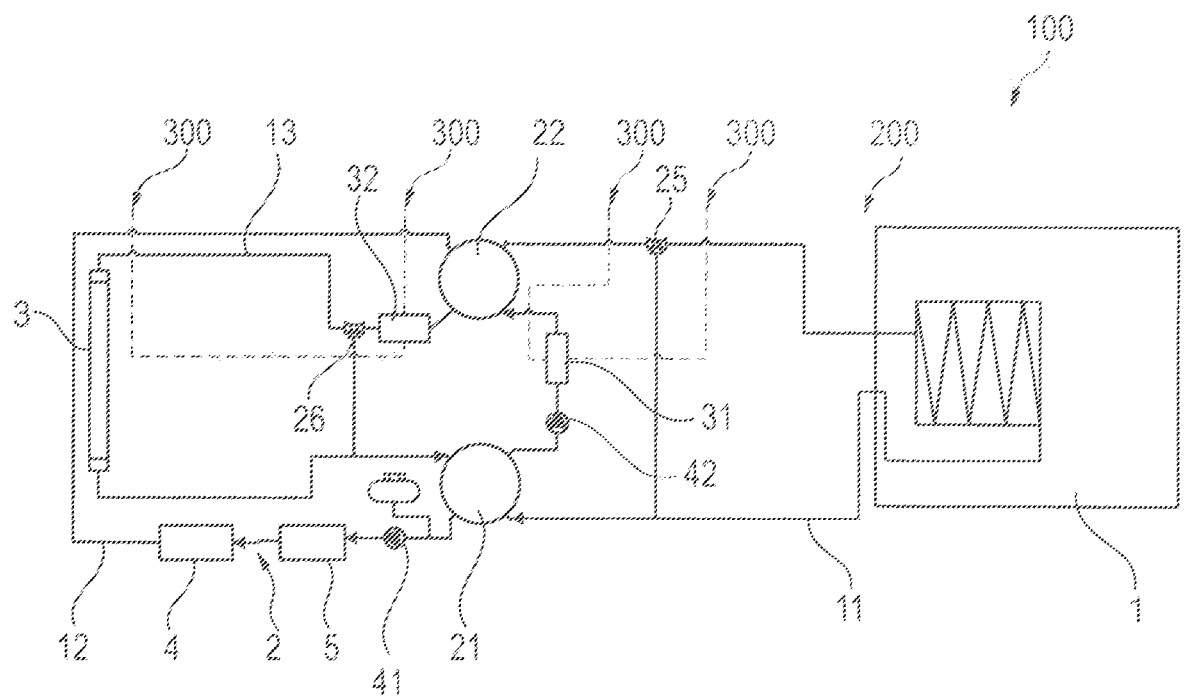
FIG. 2 shows schematically and exemplarily an embodiment of a thermal management system according to the present disclosure.

As shown in FIG. 1, the first multiple valve unit 21 and the second multiple valve unit 22 include a 5-way valve element with five ports for directing the coolant medium. Alternatively, the 5-way valve element may be replaced by a combination of a 4-way valve element and a 3-way valve element to variably direct the coolant medium as shown in FIG. 2. However, the first multiple valve unit 21 and the second multiple valve unit 22 may not be limited to the 5-way valve element, the 4-way valve element and the 3-way valve element, but a number of the ports of the first multiple valve unit 21 and the second multiple valve unit 22 may vary.

Figure 3:
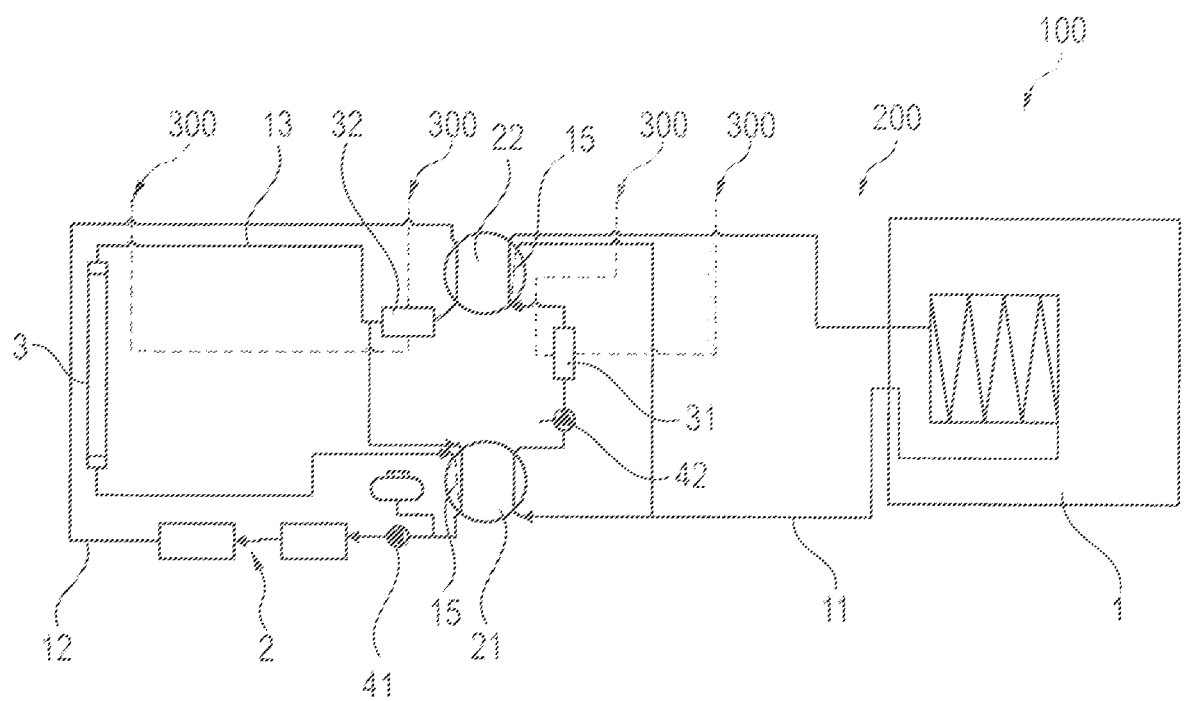
FIG. 3 shows schematically and exemplarily an embodiment of a thermal management system for vehicle cabin cooling according to the present disclosure.
Figure 4:
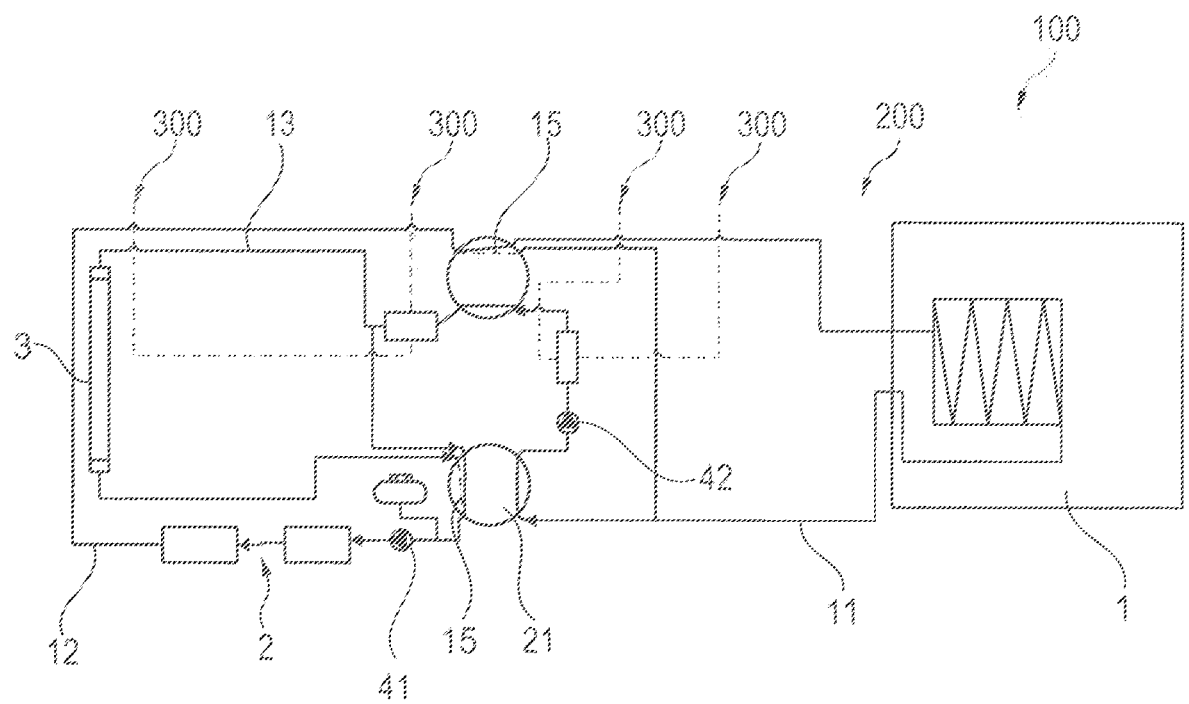
FIG. 4 shows schematically and exemplarily an embodiment of a thermal management system for vehicle cabin cooling according to the present disclosure.

FIG. 3 and FIG. 4 show the thermal management system 100 switched for vehicle cabin cooling. In the thermal management system 100, heat is transferred from the refrigerant system 300 to the coolant system 200 to cool the vehicle cabin. In FIG. 3, the first multiple valve unit 21 and the second multiple valve unit 22 couple the second control loop 12 with the third control loop 13 to collectively absorb heat from the second heat exchanger 32 and/or from the second control loop 12 independently of the first control loop 11. Accordingly, the first control loop 11 is not connected to the second heat exchanger 32 and transfers heat to the refrigerant system 300 via the first heat exchanger 31.

Depending on current and targeted temperature levels in the coolant system 200, a sub-control loop 15 may be connected to the first multiple valve unit 21 and/or the second multiple valve unit 22. FIG. 4 shows an alternative method for vehicle cabin cooling, in which the first control loop 11 is coupled with the second control loop 12 to collectively absorb heat from the second heat exchanger 32. The sub-control loop 15 may allow a flow of the coolant medium through both inlet ports and outlet ports of the first valve unit 21 and the second multiple valve unit 22.

Figure 5:
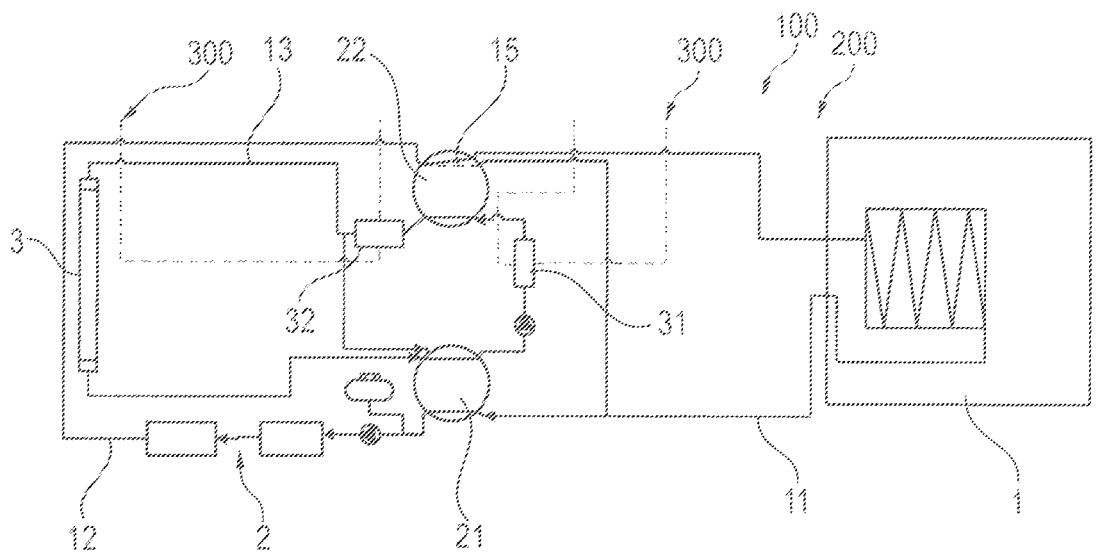
FIG. 5 shows schematically and exemplarily an embodiment of a thermal management system for vehicle cabin heating according to the present disclosure.
Figure 6:
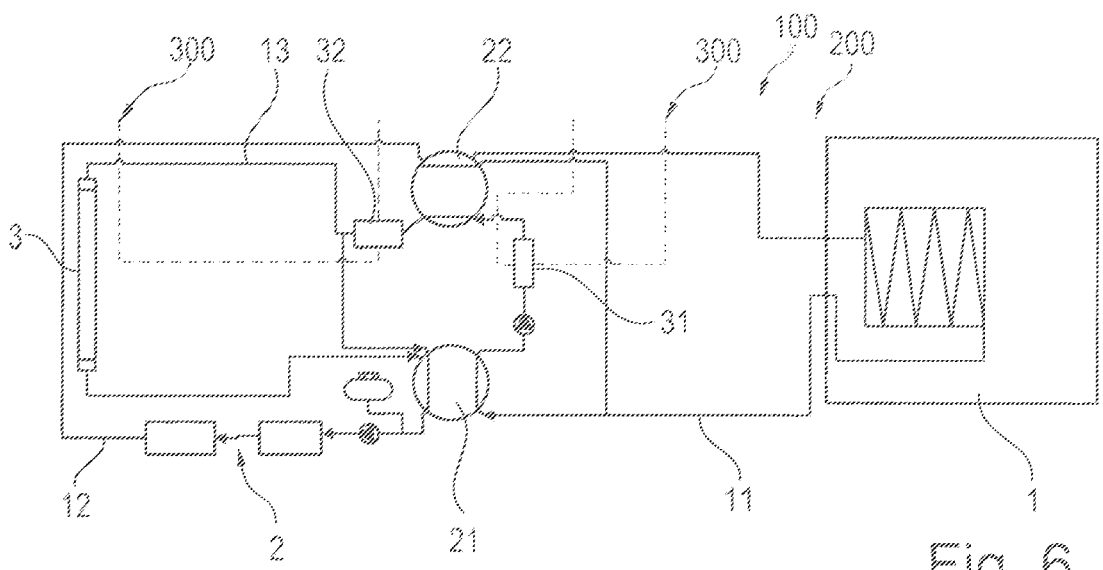
FIG. 6 shows schematically and exemplarily an embodiment of a thermal management system for vehicle cabin heating according to the present disclosure.
Figure 7:
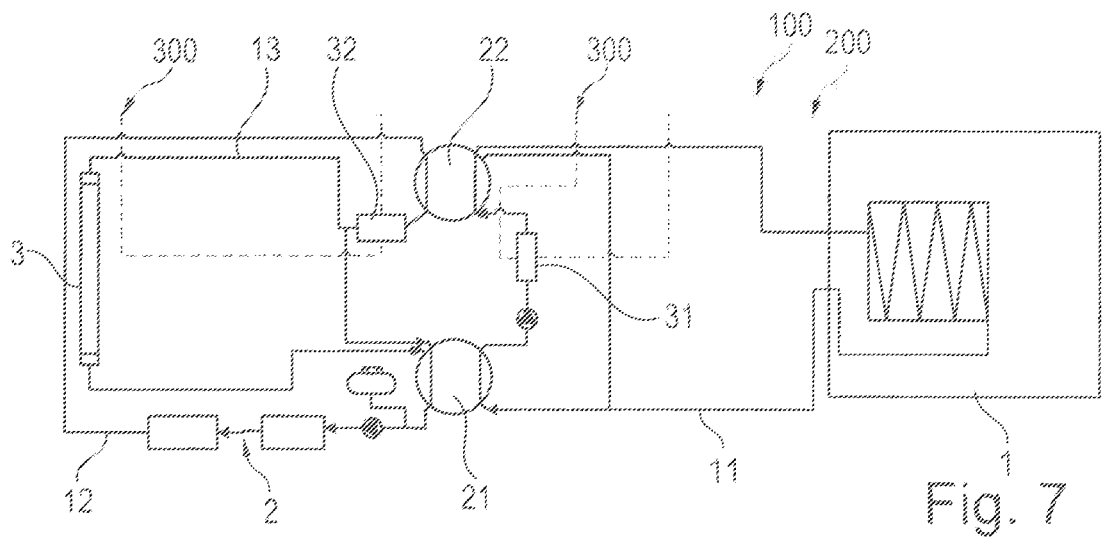
FIG. 7 shows schematically and exemplarily an embodiment of a thermal management system for vehicle cabin heating according to the present disclosure.
Figure 8:
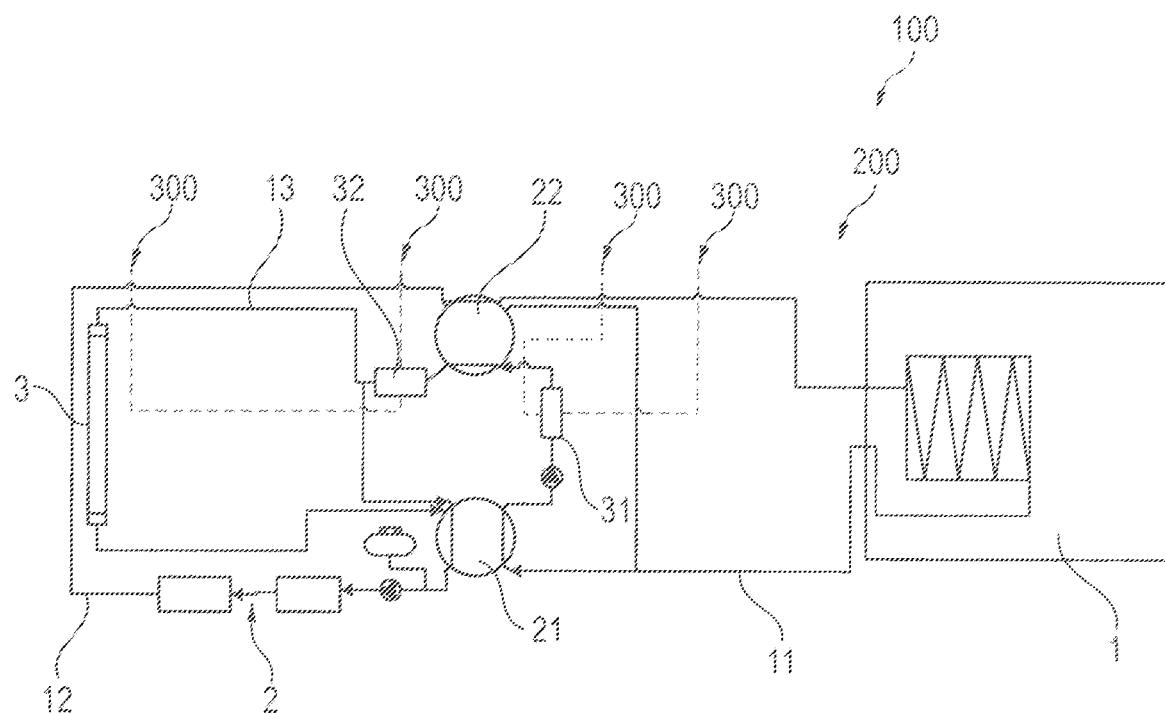
FIG. 8 shows schematically and exemplarily an embodiment of a thermal management system for vehicle cabin heating according to the present disclosure.

FIG. 5 to FIG. 7 show the thermal management system 100 configured for vehicle cabin heating. The first multiple valve unit 21 and the second multiple valve unit 22 are switched such that only one of the first control loop 11, the second control loop 12 and the third control loop 13 transfers heat to the first heat exchanger 31. In particular, in FIG. 5, only the third control loop 13 is coupled with the first heat exchanger 31 to transfer heat from ambient air to the refrigerant system 300 via the first heat exchanger 31. Additionally, the first control loop 11 and the second control loop 12 may be or may not be connected to each other to choose if the energy storage system 1 should be heated with waste heat generated in the drive train system 2 or not.

Further, only the second control loop 12 can be connected to the first heat exchanger 31 to transfer heat from the drive train system 2 to the refrigerant system 300 (see FIG. 6) or only the first control loop 11 can be connected to the first heat exchanger 31 to transfer heat from the energy storage system 1 to the refrigerant system 300 (see FIG. 7).

In addition, the control unit also switches the first multiple valve unit 21 and the second multiple valve unit 22 for vehicle cabin heating such that the first control loop 11 with the second control loop 12 are coupled to collectively transfer heat to the first heat exchanger 31 independently of the third control loop 13. Accordingly, heat is transferred from the drive train system 2 and the energy storage system 1 (see FIG. 8).

Figure 9:
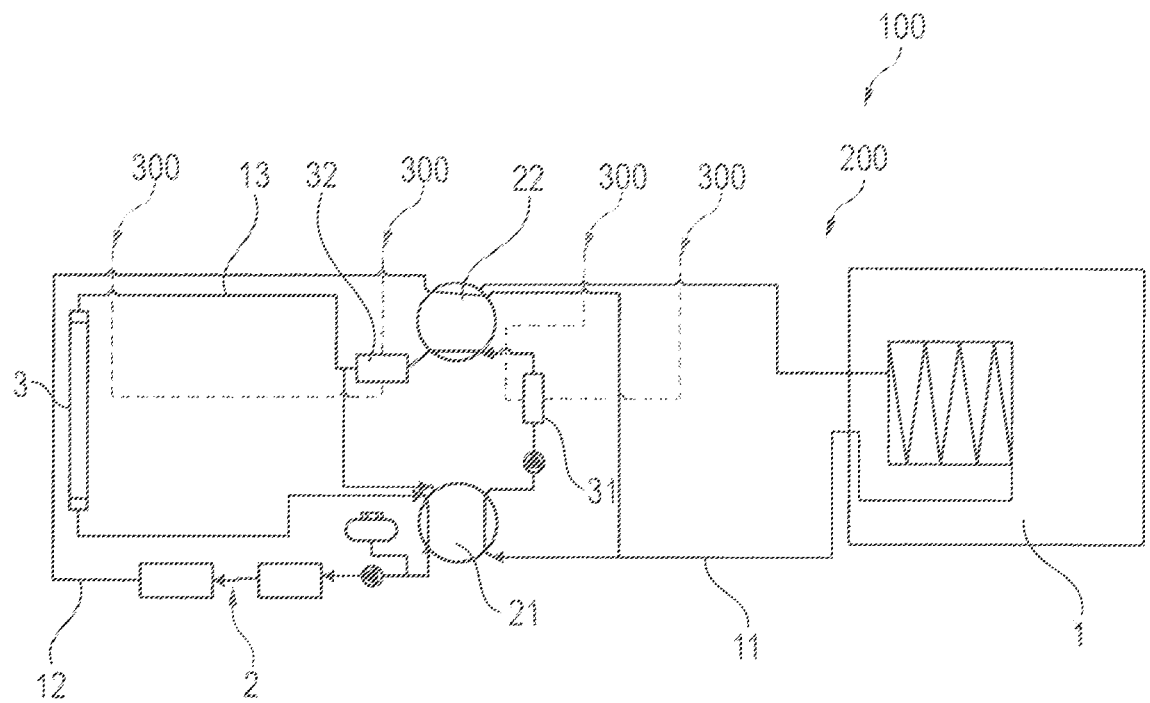
FIG. 9 shows schematically and exemplarily an embodiment of a thermal management system for vehicle cabin heating according to the present disclosure.

Alternatively, as shown in FIG. 9, the second control loop 12 with the third control loop 13 can be coupled through the first multiple valve unit 21 and the second multiple valve unit 22 to collectively transfer heat to the first heat exchanger 31 independently of the first control loop 11. Accordingly, heat is transferred from the drive train system 2 and the radiator system 3 to the first heat exchanger 31 independently of the energy storage system 1.

Figure 10:
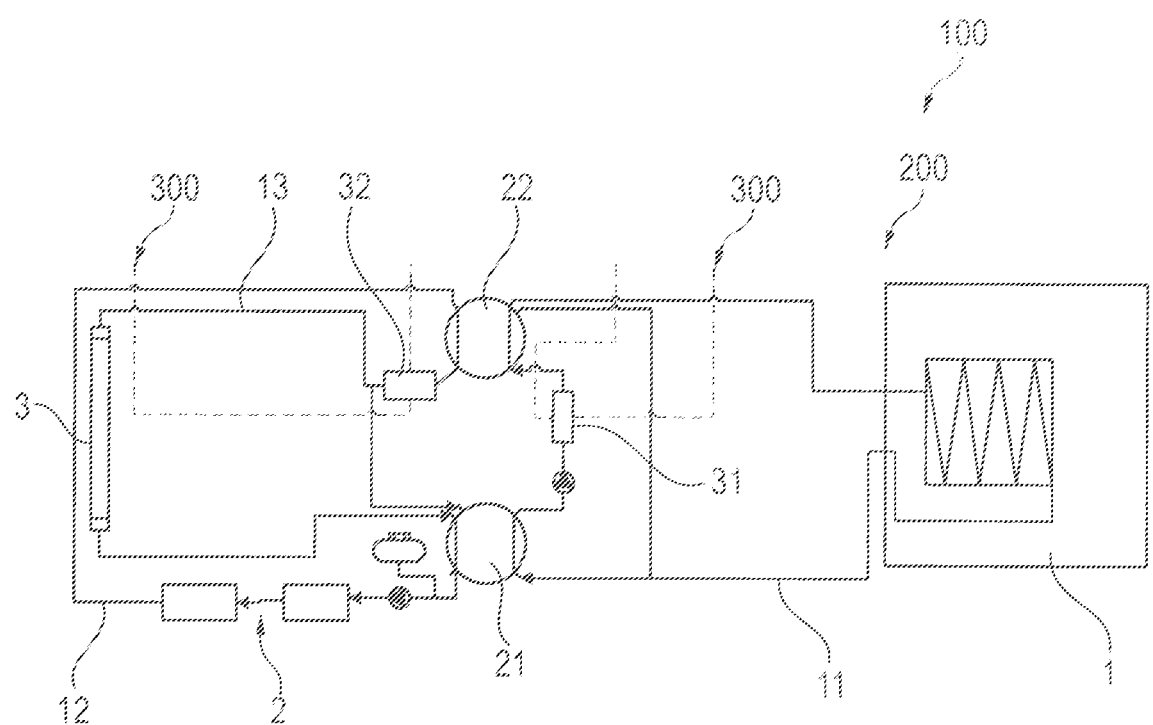
FIG. 10 shows schematically and exemplarily an embodiment of a thermal management system for thawing according to the present disclosure.
Figure 11:
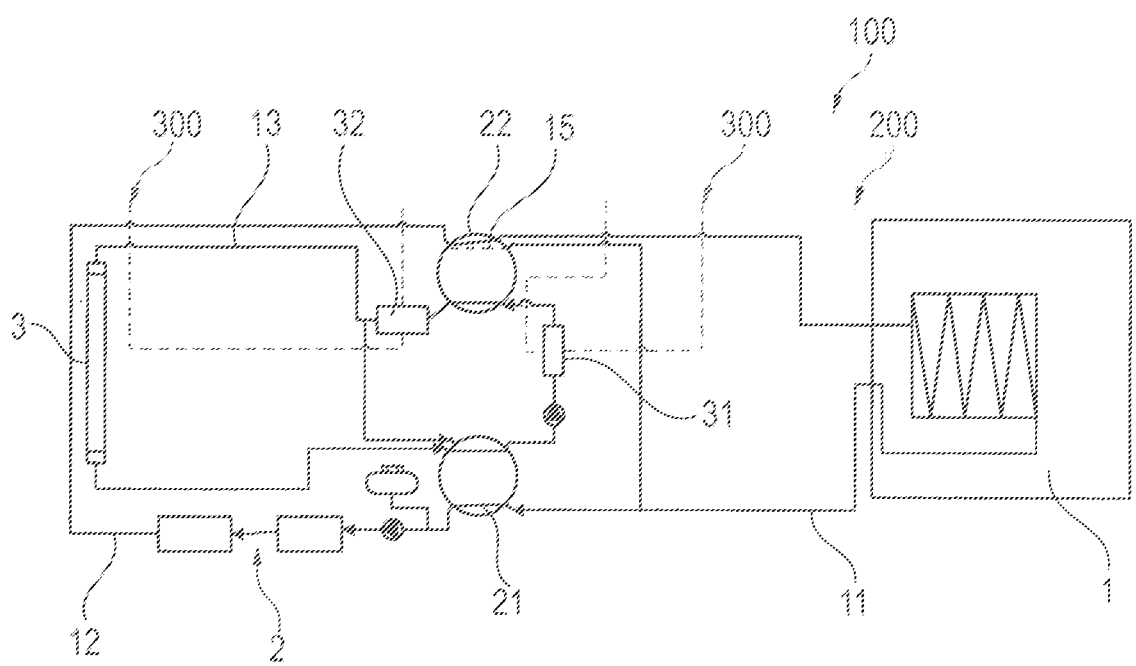
FIG. 11 shows schematically and exemplarily an embodiment of a thermal management system for thawing according to the present disclosure.

FIG. 10 and FIG. 11 show the thermal management system 100, in which the radiator system 3 can be heated. In FIG. 10, the first multiple valve unit 21 and the second multiple valve unit 22 are switched such that the second control loop 12 is connected to the third control loop 13 independently of the first control loop 11. Accordingly, heat transfer may be performed from the drive train system 2 and the second heat exchanger 32, which absorbs heat from the refrigerant system 300. Additionally, the radiator system 3 can be also heated by using the first heat exchanger thermal interface to the first control loop. Alternatively, as shown in FIG. 11, the third control loop 13 can be only connected to the first heat exchanger 31 and the second heat exchanger 32 independently of the first control loop 11 and the second control loop 12. Accordingly, heat pump from ambient air may be utilized and the radiator system 3 may be thawed by heat transferred from the refrigerant system 300.

Figure 12:
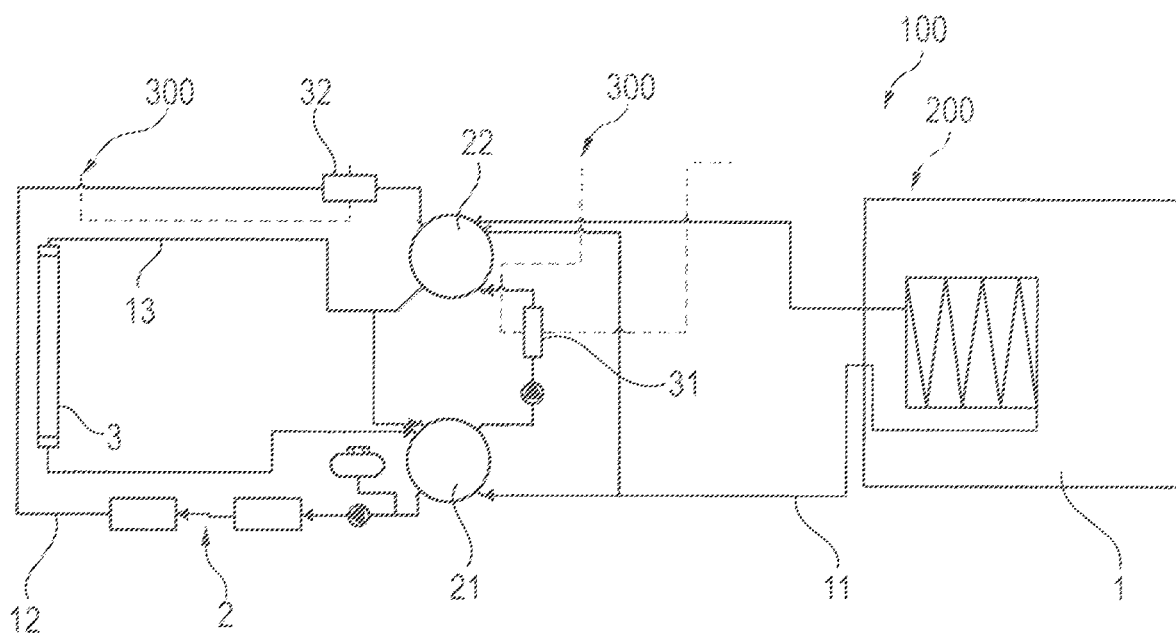
FIG. 12 shows schematically and exemplarily an embodiment of a thermal management system for energy storage heating according to the present disclosure.

Alternatively, the second heat exchanger 32 can be arranged only in the second control loop 12 (see FIG. 12). The ambient heat source may be available with the third control loop coupled to the first heat exchanger and the first and second control loop may be connected with the second heat exchanger. Accordingly, the energy storage system 1 can be heated by the second heat exchanger 32.

Figure 13:
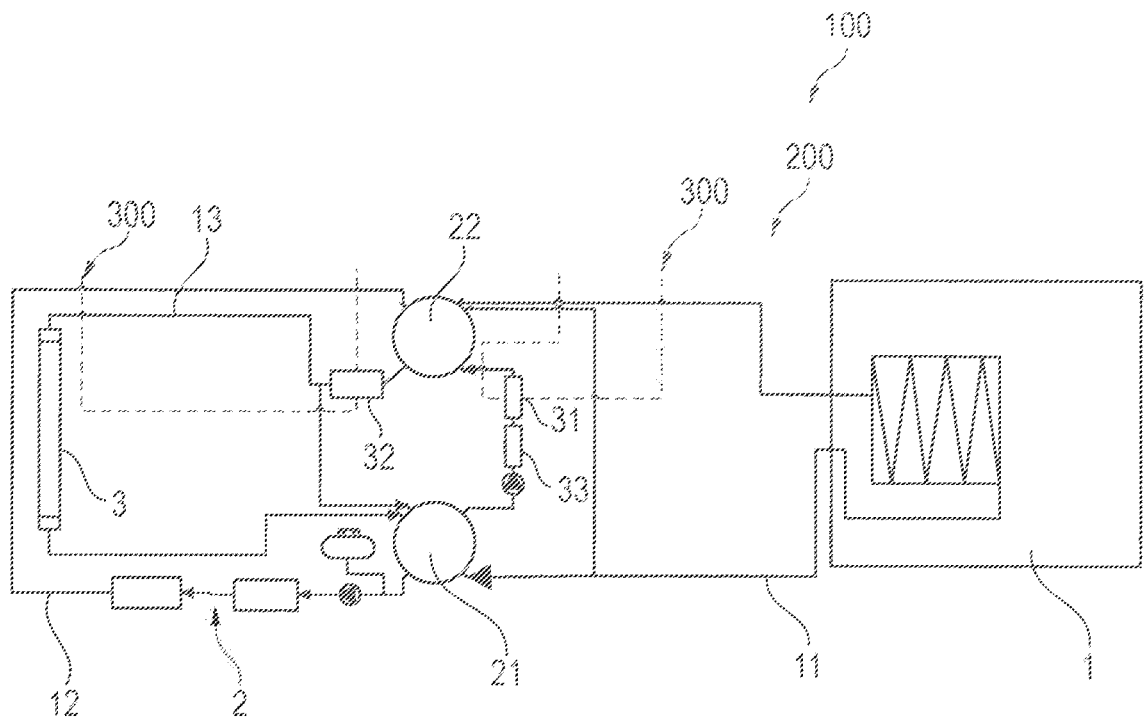
FIG. 13 shows schematically and exemplarily an embodiment of a thermal management system according to the present disclosure.
Figure 14:
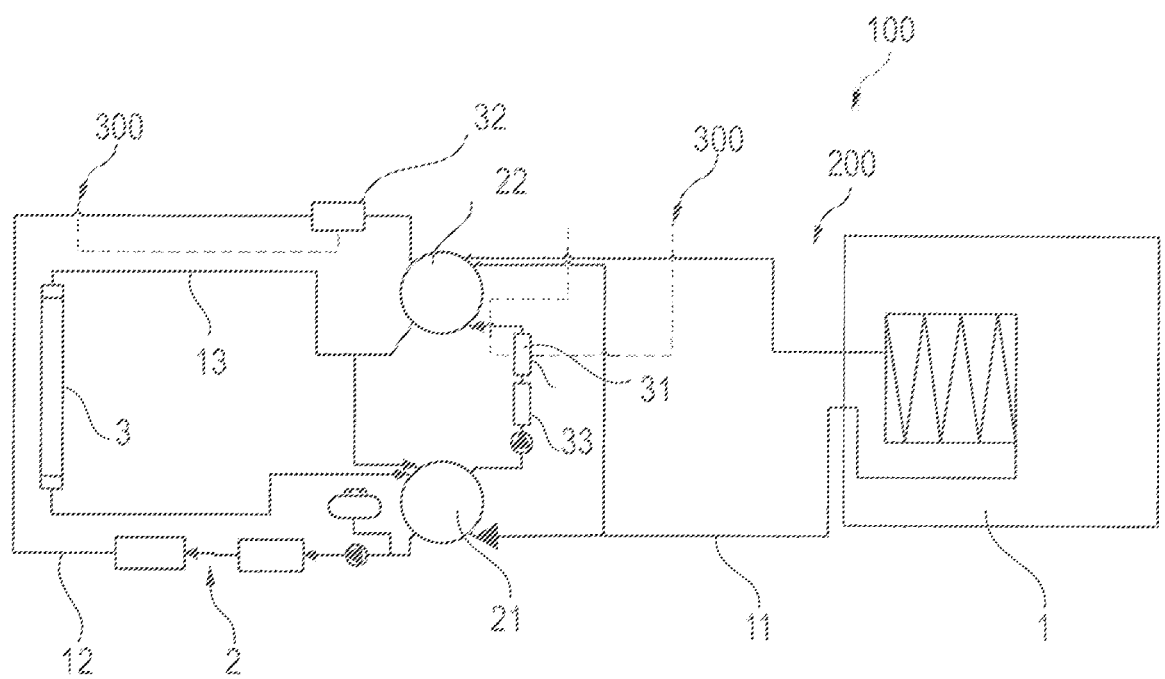
FIG. 14 shows schematically and exemplarily an embodiment of a thermal management system according to the present disclosure.
Figure 15:
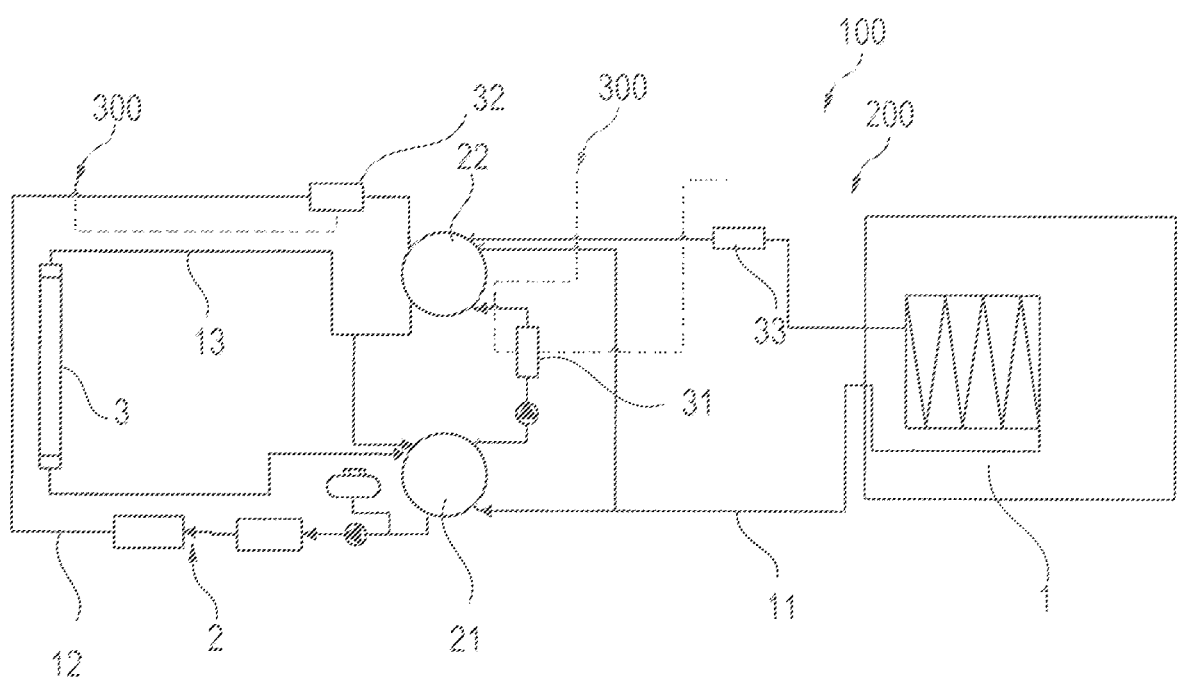
FIG. 15 shows schematically and exemplarily an embodiment of a thermal management system according to the present disclosure.

In addition, the first heat exchanger 31 can be connected to a high voltage coolant heater (HVCH) 33 to boost heating power (see FIG. 13 and FIG. 14). Thus, the high voltage coolant heater 33 transfers heat to the refrigerant system 300 via the first heat exchanger 31 and the air conditioning unit of the refrigerant system 300. Further, the control unit may switch the first multiple valve unit 21 and the second multiple valve unit 22 such that heat from the HVCH 33 may be transferred to the first control loop 11 to heat the energy storage system 1. Additionally or alternatively, the first control loop can include the HVCH 33 to improve a battery heating power, as shown in FIG. 15.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A thermal management system for a vehicle, comprising
    a refrigerant system,
    a coolant system,
    a control unit,
    the coolant system comprising:
        a first control loop thermally coupled to an energy storage system,
        a second control loop thermally coupled to a drive train system,
        a third control loop thermally coupled to a radiator system,
        a first multiple valve unit and a second multiple valve unit,
        a first heat exchanger configured to transfer heat to the refrigerant system,
        the first control loop, the second control loop and the third control loop being configured to transfer heat to the first heat exchanger,
        the first heat exchanger being arranged between the first multiple valve unit and the second multiple valve unit, and
        the control unit being configured to switch the first multiple valve unit and the second multiple valve unit to couple the first control loop with the second control loop to collectively transfer heat to the first heat exchanger independently of the third control loop, and
        a second heat exchanger arranged in the second control loop between the first multiple valve unit and the second multiple valve unit, the second heat exchanger being configured to absorb heat from the refrigerant system, the control unit being further configured to switch the first multiple valve unit and the second multiple valve unit to couple the first control loop with the second control loop to collectively absorb heat from the second heat exchanger.

2. The thermal management system according to claim 1, the control unit being further configured to switch the first multiple valve unit and the second multiple valve unit to couple the second control loop with the third control loop to collectively transfer heat to the first heat exchanger independently of the first control loop.

3. The thermal management system according to claim 1, the control unit being further configured to switch the first multiple valve unit and the second multiple valve unit to transfer heat to the first heat exchanger by only one of the first control loop, the second control loop and the third control loop separately from each other.

4. The thermal management system according to claim 1, the control unit being further configured to switch the first multiple valve unit and the second multiple valve unit to couple the second control loop with the third control loop to collectively absorb heat from the second heat exchanger independently of the first control loop.

5. The thermal management system according to claim 1, the control unit being further configured to switch the first multiple valve unit and the second multiple valve unit to transfer heat from the second heat exchanger only to the third control loop.

6. The thermal management system according to claim 1, the control unit being further configured to switch the first multiple valve unit and the second multiple valve unit to couple the third control loop with the first control loop, the second control loop and the second heat exchanger to collectively transfer heat to the third control loop.

7. The thermal management system according to claim 1, further comprising a coolant heater, the coolant heater being connected to the first heat exchanger and/or arranged in the first control loop.

8. The thermal management system according to claim 1, the the first multiple valve unit and the second multiple valve unit being connected to a sub-control loop to adjust temperature of the coolant system and/or to divide heat transfer.

9. The thermal management system according to claim 1, the first multiple valve unit and/or the second multiple valve unit comprising a 5-way valve element.

10. The thermal management system according to claim 1, the first multiple valve unit and/or the second multiple valve unit comprising a 4-way valve element and a 3-way valve element.

11. A vehicle comprising the thermal management system according to claim 1.

12. A manufacturing method of a thermal management system for a vehicle, comprising:
providing a refrigerant system,
providing a coolant system comprising a first control loop, a second control loop and a third control loop,
providing a control unit,
thermally coupling an energy storage system to the first control loop,
thermally coupling a drive train system to the second control loop,
thermally coupling a radiator system to the third control loop, and
arranging a first heat exchanger between a first multiple valve unit and a second multiple valve unit, the first heat exchanger being configured to transfer heat to the refrigerant system,
the first control loop, the second control loop and the third control loop being configured to transfer heat to the first heat exchanger, and
the control unit being configured to switch the first multiple valve unit and the second multiple valve unit to couple the first control loop with the second control loop to collectively transfer heat to the first heat exchanger independently of the third control loop, and
arranging a second heat exchanger in the second control loop between the first multiple valve unit and the second multiple valve unit, the second heat exchanger being configured to absorb heat from the refrigerant system,
the control unit being further configured to switch the first multiple valve unit and the second multiple valve unit to couple the first control loop with the second control loop to collectively absorb heat from the second heat exchanger.

13. A thermal management system for a vehicle, comprising
a refrigerant system,
a coolant system,
a control unit,
the coolant system comprising:
a first control loop thermally coupled to an energy storage system,
a second control loop thermally coupled to a drive train system,
a third control loop thermally coupled to a radiator system,
a first multiple valve unit and a second multiple valve unit,
a first heat exchanger configured to transfer heat to the refrigerant system,
the first control loop, the second control loop and the third control loop being configured to transfer heat to the first heat exchanger,
the first heat exchanger being arranged between the first multiple valve unit and the second multiple valve unit, and
the control unit being configured to switch the first multiple valve unit and the second multiple valve unit to couple the first control loop with the second control loop to collectively transfer heat to the first heat exchanger independently of the third control loop, and
a second heat exchanger arranged in the second control loop between the first multiple valve unit and the second multiple valve unit, the second heat exchanger being configured to absorb heat from the refrigerant system,
the control unit being further configured to switch the first multiple valve unit and the second multiple valve unit to couple the third control loop with the first control loop, the second control loop and the second heat exchanger to collectively transfer heat to the third control loop.

14. The thermal management system according to claim 13, the control unit being further configured to switch the first multiple valve unit and the second multiple valve unit to couple the second control loop with the third control loop to collectively transfer heat to the first heat exchanger independently of the first control loop.

15. The thermal management system according to claim 13, the control unit being further configured to switch the first multiple valve unit and the second multiple valve unit to transfer heat to the first heat exchanger by only one of the first control loop, the second control loop and the third control loop separately from each other.

16. The thermal management system according to claim 13, the control unit being further configured to:
switch the first multiple valve unit and the second multiple valve unit to couple the second control loop with the third control loop to collectively absorb heat from the second heat exchanger independently of the first control loop,
switch the first multiple valve unit and the second multiple valve unit to couple the first control loop with the second control loop to collectively absorb heat from the second heat exchanger, and
switch the first multiple valve unit and the second multiple valve unit to transfer heat from the second heat exchanger only to the third control loop.

17. The thermal management system according to claim 13, further comprising a coolant heater, the coolant heater being connected to the first heat exchanger and/or arranged in the first control loop.

18. The thermal management system according to claim 13, the the first multiple valve unit and the second multiple valve unit being connected to a sub-control loop to adjust temperature of the coolant system and/or to divide heat transfer.

19. The thermal management system according to claim 13, the first multiple valve unit and/or the second multiple valve unit comprising a 5-way valve element.

20. The thermal management system according to claim 13, the first multiple valve unit and/or the second multiple valve unit comprising a 4-way valve element and a 3-way valve element.

* * * * *